United States Patent
Solomon et al.

(10) Patent No.: US 7,105,593 B2
(45) Date of Patent: Sep. 12, 2006

(54) AQUEOUS POLYMER BLEND COMPOSITION

(75) Inventors: Robert David Solomon, Souderton, PA (US); Mary Anne Regina Matthews, Willow Grove, PA (US)

(73) Assignee: Rohm and Haas Company, Philadelphia, PA (US)

(*) Notice: Subject to any disclaimer, the term of this patent is extended or adjusted under 35 U.S.C. 154(b) by 0 days.

(21) Appl. No.: 10/996,775

(22) Filed: Nov. 24, 2004

(65) Prior Publication Data

US 2005/0106402 A1    May 19, 2005

Related U.S. Application Data

(63) Continuation of application No. 10/162,456, filed on Jun. 4, 2002, now abandoned.

(51) Int. Cl.
*C08J 3/02*    (2006.01)
(52) U.S. Cl. .................. 524/457; 524/458; 524/460; 524/501
(58) Field of Classification Search ............... 524/457, 524/458, 460, 601
See application file for complete search history.

(56) References Cited

U.S. PATENT DOCUMENTS

| | | | |
|---|---|---|---|
| 4,477,622 A | 10/1984 | Sanderson et al. | |
| 4,501,845 A | 2/1985 | Baus et al. | |
| 5,258,424 A | 11/1993 | Yagi et al. | |
| 5,308,890 A | 5/1994 | Snyder | |
| 5,334,655 A * | 8/1994 | Carlson et al. | 524/804 |
| 5,753,742 A | 5/1998 | Bumaniag | |
| 5,990,228 A | 11/1999 | Eichman et al. | |

FOREIGN PATENT DOCUMENTS

| | | | |
|---|---|---|---|
| EP | 1197532 | | 4/2002 |
| JP | SH 963-18632 | * | 4/1988 |

* cited by examiner

*Primary Examiner*—D. S. Nakarani
(74) *Attorney, Agent, or Firm*—Gary D. Greenblatt

(57) ABSTRACT

An aqueous polymer blend composition containing particles of a first polymer and particles of a second polymer with preferred molecular weight ranges is provided. Coatings prepared from the aqueous polymer blend composition may be employed as coatings which have water whitening resistance and provide resistance to efflorescence to cementitious substrates, such as roof tiles. A method of preparing a coated cementitious substrate with the aqueous polymer blend composition and an article containing the coated cementitious substrate are also provided.

4 Claims, No Drawings

AQUEOUS POLYMER BLEND COMPOSITION

This application is a continuation of and claims the benefit under 35 U.S.C. §120 to prior U.S. patent application Ser. No. 10/162,456 filed Jun. 4, 2002 now abandoned.

This invention relates to an aqueous polymer blend composition containing particles of a first polymer and particles of a second polymer. Further, this invention relates to a method of applying the aqueous polymer blend composition onto a substrate and an article prepared having a coating formed from the aqueous polymer blend composition. The aqueous polymer blend composition is useful for providing a coating on a cementitious substrate.

Concrete roof tiles are susceptible to efflorescence, the formation of white mineral deposits on the surface of the concrete roof tile. These white mineral deposits are unevenly distributed on the surface and produce an unsightly mottle appearance. Efflorescence also detracts from the appearance of the concrete roof tile by diminishing the color intensity of a colored concrete roof tile. Efflorescence may occur during the step of curing the concrete roof tile and is typically referred to as primary efflorescence. Efflorescence may also occur as a result of long-term exposure of the cementitious substrate to weathering and is typically referred to as secondary efflorescence.

Polymeric coatings are known to protect the concrete roof tile from the effects of weathering, thus minimizing secondary efflorescence. However, these polymeric coatings, which are typically clear coatings, may become white in the presence of moisture. This undesirable effect is referred to as water whitening. Polymeric coatings that minimize primary and secondary efflorescence, and are resistant to water whitening are desired.

Japanese Patent application 63-18632 discloses a water based coating composition containing a low molecular weight emulsion polymer and a high molecular weight emulsion polymer. The disclosed water based coating composition is characterized by a wide molecular weight distribution in which more than 15 weight % of the total polymer has a molecular weight of less than 52,000 and more than 15 weight % of the total polymer has a molecular weight greater than 255,000. The water based coating composition may be applied onto various substrates including concrete and mortar. However, this reference does not disclose the application of the emulsion polymer onto uncured concrete and then curing the concrete to provide a coated cementitious substrate with primary and secondary efflorescence resistance and water whitening resistance.

We have surprisingly found that an aqueous polymer blend composition that provides good water whitening resistance and good efflorescence resistance to cement roof tiles can be prepared by blending particles of a first polymer having high molecular weight and particles of a second polymer having low molecular weight.

In the first aspect of this invention, an aqueous polymer blend composition is provided containing particles of a first polymer; and particles of a second polymer, wherein the first polymer has a weight average molecular weight of 250,000 or greater, wherein the second polymer has a weight average molecular weight of 150,000 or less, wherein the particles of the second polymer have an average diameter in the range of 20 nm to 350 nm, wherein the glass transition temperature of the first polymer and the glass transition temperature of the second polymer have substantially the same value, wherein the weight ratio of the first polymer to the second polymer is in the range of 1:3 to 3:1, and wherein the average glass transition temperature of the first polymer and the second polymer is in the range of 15° C. to 50° C.

The second aspect of this invention relates to a method for preparing a coated cementitious substrate including the steps of preparing an aqueous polymer blend composition containing: particles of a first polymer; and particles of a second polymer; wherein the first polymer has a weight average molecular weight of 250,000 or greater; wherein the second polymer has a weight average molecular weight of 150,000 or less; wherein the particles of the second polymer have an average diameter in the range of 20 nm to 350 nm; wherein the glass transition temperature of the first polymer and the glass transition temperature of the second polymer have substantially the same value; wherein the weight ratio of the first polymer to the second polymer is in the range of 1:3 to 3:1; and wherein the average glass transition temperature of the first polymer and the second polymer is in the range of 15° C. to 50° C.; applying the aqueous polymer blend composition onto a green cementitious substrate to form a coated green cementitious substrate; and curing or allowing to cure the coated green cementitious substrate to form the coated cementitious substrate.

In the third aspect of this invention, an article is provided including a coated cementitious substrate containing a cementitious substrate and a coating formed from an aqueous polymer blend composition containing: particles of a first polymer; and particles of a second polymer; wherein the first polymer has a weight average molecular weight of 250,000 or greater; wherein the second polymer has a weight average molecular weight of 150,000 or less; wherein the particles of the second polymer have an average diameter in the range of 20 nm to 350 nm; wherein the glass transition temperature of the first polymer and the glass transition temperature of the second polymer have substantially the same value; wherein the weight ratio of the first polymer to the second polymer is in the range of 1:3 to 3:1; and wherein the average glass transition temperature of the first polymer and the second polymer is in the range of 15° C. to 50° C.; and wherein the aqueous polymer blend composition is applied onto the cementitious substrate prior to cure of the cementitious substrate.

As used herein, the term "(meth)acrylate" refers to either acrylate of methacrylate, the term "(meth)acrylic" refers to either acrylic or methacrylic, and the term "(meth)acrylamide" refers to either acrylamide or methacrylamide.

"Glass transition temperature" or "$T_g$" as used herein, means the temperature at or above which a glassy polymer will undergo segmental motion of the polymer chain. The $T_g$ of a polymer can be measured by various techniques including, for example, differential scanning calorimetry ("DSC"). The particular values of $T_g$ reported herein are determined by differential scanning calorimetry using the midpoint in the heat flow versus temperature transition as the $T_g$ value.

"Cementitious substrate" as used herein, refers to an article prepared from a cement mix or having a surface coated with cement mix. A cement mix is a mixture including cement, sand, and water. Polymer may optionally be included in the mixture. "Green cementitious substrate" as used herein, refers to an article prepared from a cement mix or containing a surface coated with cement mix wherein the cement mix is not cured.

The aqueous polymer blend composition of this invention contains particles of a first polymer and particles of a second polymer. The first polymer has a higher molecular weight than the second polymer. The blend of the higher molecular weight polymer and the lower molecular weight polymer in the aqueous polymer blend composition, which is suitable for application onto green cementitious substrates, provides a coating with water whitening resistance and is useful for minimizing primary efflorescence and secondary efflorescence.

The first polymer contained in the aqueous polymer blend composition is a higher molecular weight polymer than the second polymer. The first polymer has a weight average molecular weight, $M_w$, in the range of 250,000 or greater, preferably in the range of 500,000 or greater, and more preferably in the range of 750,000 or greater. The first polymer is contained in the aqueous polymer blend composition as particles which may have an average particle diameter in the range of 20 nm to 1000 nm, preferably in the range of 20 nm to 500 nm, and more preferably, in the range of 20 nm to 350 nm.

The second polymer contained in the aqueous polymer blend composition is a lower molecular weight polymer with a weight average molecular weight in the range of 10,000 to 150,000, preferably in the range of 20,000 to 100,000, and more preferably in the range of 25,000 to 75,000. The second polymer is contained in the aqueous polymer blend composition as particles which may have an average particle diameter in the range of 20 nm to 1000 nm. It is preferred that the second polymer has an average particle diameter in the range of 20 nm to 350 nm and more preferably, in the range of 20 nm to 250 nm.

The first polymer and the second polymer may be individually prepared by the addition polymerization of at least one ethylenically unsaturated monomer. Suitable ethylenically unsaturated monomers include nonionic monomers, such as, for example, (meth)acrylic esters including $C_1$ to $C_{40}$ esters of (meth)acrylic acid such as methyl(meth)acrylate, ethyl(meth)acrylate, butyl(meth)acrylate, 2-ethylhexyl (meth)acrylate, decyl(meth)acrylate, lauryl(meth)acrylate, stearyl(meth)acrylate, isobornyl(meth)acrylate; hydroxyethyl(meth)acrylate; hydroxypropyl(meth)acrylate; styrene or substituted styrenes; butadiene; vinyl acetate or other vinyl esters; vinyl monomers such as vinyl chloride, vinylidene chloride, N-vinyl pyrrolidone; and acrylonitrile or methacrylonitrile. Other suitable ethylenically unsaturated monomers include ionic monomers such as acid monomers or amide monomers, which may be used at levels of 0.1% to 7% by weight based on the weight of the first polymer or the second polymer. Examples of acid monomers include (meth)acrylic acid, crotonic acid, fumaric acid, itaconic acid, phosphoethyl (meth)acrylate, 2-acrylamido-2-methyl-1-propanesulfonic acid, sodium vinyl sulfonate, fumaric acid, maleic acid, monomethyl itaconate, monomethyl fumarate, monobutyl fumarate, and maleic anhydride. Examples of amide monomers include (meth)acrylamide and monosubstituted (meth) acrylamides.

Optionally, the first polymer or the second polymer may contain as polymerized units ethylenically unsaturated monomers selected at least one functional monomer, which may be used at levels of 10 weight % based on the weight of the first polymer or second polymer, respectively. Examples of functional monomers include silicone containing ethylenically unsaturated monomers, such as vinyl trimethoxy silane and methacryloxy propyl trimethoxy silane; and cross-linking monomers. Suitable crosslinking monomers include acetoacetate-functional monomers such as acetoacetoxyethyl acrylate, acetoacetoxypropyl methacrylate, acetoacetoxyethyl methacrylate, allyl acetoacetate, acetoacetoxybutyl methacrylate, and 2,3-di(acetoacetoxy) propyl methacrylate; divinyl benzene, (meth)acryloyl polyesters of polyhydroxylated compounds, divinyl esters of polycarboxylic acids, diallyl esters of polycarboxylic acids, diallyl dimethyl ammonium chloride, triallyl terephthalate, methylene bis acrylamide, diallyl maleate, diallyl fumarate, hexamethylene bis maleamide, triallyl phosphate, trivinyl trimellitate, divinyl adipate, glyceryl trimethacrylate, diallyl succinate, divinyl ether, the divinyl ethers of ethylene glycol or diethylene glycol diacrylate, polyethylene glycol diacrylates of methacrylates, 1,6-hexanediol diacrylate, pentaerythritol triacrylate or tetraacrylate, neopentyl glycol diacrylate, allyl methacrylate, cyclopentadiene diacrylate, the butylene glycol diacrylates or dimethacrylates, trimethylolpropane di- or tri-acrylates, (meth)acrylamide, n-methylol (meth)acrylamide, and mixtures thereof. The amount of cross-linker monomer utilized is chosen such that the cross-linker monomer does not materially interfere with film formation. In one embodiment, the first polymer contains as polymerized units from 0.1 to 5 weight % at least one functional monomer, based on the weight of the first polymer. In a second embodiment, the second polymer contains as polymerized units from 0.1 to 5 weight % at least one functional monomer, based on the weight of the second polymer. In a third embodiment, the first polymer contains as polymerized units less than 2 weight %, preferably less than 1 weight %, and more preferably 0 weight % of acetoacetate-functional monomers. In a fourth embodiment, the second polymer contains as polymerized units less than 2 weight %, preferably less than 1 weight %, and more preferably 0 weight % of acetoacetate-functional monomers. In a fifth embodiment, the first polymer or the second polymer contain 0 weight % functional monomer as polymerized units, preferably both the first polymer and the second polymer contain 0 weight % functional monomer as polymerized units.

In one embodiment, the first polymer contains as polymerized units, based on the weight of the first polymer, from 85 to 99.9 weight % of at least one nonionic monomer, from 0.1 to 10 weight % of at least one ionic monomer, and, 0 to 5 weight % of at least one functional monomer, wherein the sum of the ethylenically unsaturated nonionic monomer, the ethylenically unsaturated ionic monomer, and the optional ethylenically unsaturated functional monomer equals 100%.

In another embodiment, the second polymer contains as polymerized units, based on the weight of the first polymer, from 85 to 99.9 weight % of at least one nonionic monomer, from 0.1 to 10 weight % of at least one ionic monomer, and, 0 to 5 weight % of at least one functional monomer, wherein the sum of the ethylenically unsaturated nonionic monomer, the ethylenically unsaturated ionic monomer, and the optional ethylenically unsaturated functional monomer equals 100%.

The glass transition temperature of the first polymer may be in the range of −10° C. to 80° C., preferably in the range of 0° C. to 60° C., and more preferably in the range of 10° C. to 50° C. The glass transition temperature of the second polymer may be in the range of −10° C. to 80° C., preferably in the range of 0° C. to 60° C., and more preferably in the range of 10° C. to 50° C.

The first polymer or the second polymer may be prepared by bulk, precipitation, suspension, or emulsion polymerization techniques. The polymerization may be a single stage process or a multi-stage process. Preparation by bulk or precipitation polymerization techniques may be followed by dispersion of the first polymer or second polymer into an aqueous medium to prepare the first polymer dispersion or second polymer dispersion, respectively. Emulsion polymerization is a preferred process for the preparation of the first polymer to provide a first polymer dispersion. Emulsion polymerization is a preferred process for the preparation of the second polymer to provide a second polymer dispersion.

The preparation of polymers by emulsion polymerization for use in coating applications is well known in the art. The practice of emulsion polymerization is discussed in detail in D. C. Blackley, *Emulsion Polymerization* (Wiley, 1975). Conventional emulsion polymerization techniques may be used to prepare the emulsion polymer of this invention as an aqueous dispersion polymer. The practice of emulsion polymerization is also discussed in H. Warson, *The Applications of Synthetic Resin Emulsions*, Chapter 2 (Ernest Benn Ltd., London 1972).

Thus the ethylenically unsaturated monomers including the nonionic monomer, the ionic monomer, and the optional functional monomer may be emulsified with an anionic or nonionic dispersing agent, also referred to as a surfactant, using for example from 0.05 to 10% by weight of dispersing agent on the weight of total monomers. Combinations of anionic and nonionic dispersing agents may also be used. High molecular weight polymers such as hydroxy ethyl cellulose, methyl cellulose, and vinyl alcohol may be used as emulsion stabilizers and protective colloids, as may polyelectrolytes such as polyacrylic acid. Acidic monomers particularly those of low molecular weight, such as acrylic acid and methacrylic acid, are water soluble, and thus may serve as dispersing agents which aid in emulsifying the other monomers used.

Suitable anionic dispersing agents include, for example, the higher fatty alcohol sulfates, such as sodium lauryl sulfate; alkylaryl sulfonates such as sodium or potassium isopropylbenzene sulfonates or isopropyl naphthalene sulfonates; alkali metal higher alkyl sulfosuccinates, such as sodium octyl sulfosuccinate, sodium N-methyl-N-palmitoyl-laurate, sodium oleyl isothionate; and alkali metal salts of alkylarylpolyethoxyethanol sulfates, sulfonates, or phosphates, such as sodium tert-octylphenoxypolyethoxyethyl sulfate having 1 to 5 oxyethylene units; and alkali metal salts of alkyl polyethoxyethanol sulfates, sulfonates, and phosphates.

Suitable nonionic dispersing agents include alkylphenoxypolyethoxyethanols having alkyl groups of from about 7 to 18 carbon atoms and from about 6 to about 60 oxyethylene units, such as heptylphenoxypolyethoxyethanols, methyloctyl phenoxypolyethoxyethanols; polyethoxyethanol derivatives of methylene-linked alkyl phenols; sulfur-containing agents such as those made by condensing from about 6 to 60 moles of ethylene oxide with nonyl mercaptan, dodecyl mercaptan, or with alkylthiophenols wherein the alkyl groups contain from 6 to 16 carbon atoms; ethylene oxide derivatives of long chained carboxylic acids, such as lauric acid, myristic acid, palmitic acid, oleic acid, or mixtures of acids such as those found in tall oil containing from 6 to 60 oxyethylene units per molecule; analogous ethylene oxide condensates of long chained alcohols such as octyl, decyl, lauryl, or cetyl alcohols, ethylene oxide derivatives of etherified or esterified polyhydroxy compounds having a hydrophobic hydrocarbon chain, such as sorbitan monostearate containing from 6 to 60 oxyethylene units; block copolymers of ethylene oxide section combined with one or more hydrophobic propylene oxide sections. Mixtures of alkyl benzenesulfonates and ethoxylated alkylphenols may be employed.

The first polymer or the second polymer may contain as a polymerized unit a copolymerizable surfactant having at least one polymerizable ethylenically unsaturated bond.

Preferably the dispersion containing the first polymer contains a total level of surfactant of 2 weight % or less, more preferably 1.5 weight % or less, and most preferably 1 weight % or less, based on the weight of the first polymer. Preferably the dispersion containing the second polymer contains a total level of surfactant of 2 weight % or less, more preferably 1.5 weight % or less, and most preferably 1 weight % or less, based on the weight of the second polymer. Higher levels of surfactant may result in reduced water whitening resistance and reduced primary and secondary efflorescence resistance. In a preferred embodiment, the aqueous polymer blend composition contains a total level of surfactant of 2 weight % or less, more preferably 1.5 weight % or less, and most preferably 1 weight % or less, based on the total weight of the first polymer and the second polymer.

A polymerization initiator of the free radical type, such as ammonium or potassium persulfate, may be used alone or as the oxidizing component of a redox system, which also includes a reducing component such as potassium metabisulfite, sodium thiosulfate, or sodium formaldehyde sulfoxylate. The reducing component is frequently referred to as an accelerator. The initiator and accelerator, commonly referred to as catalyst, catalyst system, or redox system, may be used in proportion from about 0.01% or less to 3% each, based on the weight of monomers to be copolymerized. Examples of redox catalyst systems include t-butyl hydroperoxide/sodium formaldehyde sulfoxylate/Fe(II) and ammonium persulfate/sodium bisulfite/sodium hydrosulfite/Fe(II). The polymerization temperature may be from 10° C. to 90° C., or more, and may be optimized for the catalyst system employed, as is conventional. Emulsion polymerization may be seeded or unseeded. Seeded polymerization is preferred and tends to yield aqueous dispersions of polymer having more uniform physical properties than unseeded polymerization.

An important aspect of the present invention is the molecular weights of the first polymer and the second polymer. In an emulsion polymerization process, molecular weights within the molecular weight ranges specified for the first polymer and the second polymer, may be obtained with the use of chain transfer agents such as mercaptans, polymercaptan, and polyhalogen compounds in the polymerization mixture to moderate the molecular weight of the first polymer or the second polymer of this invention. Examples of chain transfer agents which may be used include long chain alkyl mercaptans such as t-dodecyl mercaptans, alcohols such as isopropanol, isobutanol, lauryl alcohol, or t-octyl alcohol, carbon tetrachloride, tetrachloroethylene, and trichlorobromoethane. Generally from 0.1 to 3 weight %, based on the weight of total monomer, may be used. Alternatively, suitable molecular weights may be obtained by increasing the initiator level, or by a combination of increased initiator level and a chain transfer agent. A preferred polymerization process to prepare the second polymer includes emulsion polymerization in the presence of a chain transfer agent. A more preferred polymerization process to prepare the second polymer includes emulsion polymerization in the presence of long chain alkyl mercaptans.

The polymerization process to prepare the first polymer or the second polymer may be a thermal or redox type; that is, free radicals may be generated solely by the thermal dissociation of an initiator species or a redox system may be used. A monomer emulsion containing all or some portion of the monomers to be polymerized may be prepared using the monomers, water, and surfactants. A catalyst solution containing catalyst in water may be separately prepared. The monomer emulsion and catalyst solution may be cofed into the polymerization vessel over the course of the emulsion polymerization. The reaction vessel itself may initially contain water. The reaction vessel may also additionally contain seed emulsion and further may additionally contain an initial charge of the polymerization catalyst. The temperature of the reaction vessel during the emulsion polymerization may be controlled by cooling to remove heat generated by the polymerization reaction or by heating the reaction vessel. Several monomer emulsions may be simultaneously cofed into the reaction vessel. When multiple monomer emulsions are cofed, they may be of different monomer compositions. The sequence and rates at which the different monomer emulsions are cofed may be altered during the emulsion polymerization process. The pH of the contents of the reaction vessel may also be altered during the course of the emulsion polymerization process. Preferably the pH of the emulsion polymerization process to prepare the first polymer or the second polymer is less than 7, more preferably in the range of 5–6.

In one embodiment, both the average particle diameter of the first polymer particles and average particle diameter of the second polymer particles in the aqueous polymer blend composition are in the range of 60 nm to 170 nm and preferably in the range of 70 nm to 150 nm. In this embodiment, the aqueous polymer blend composition may be applied onto a green cementitious substrate to provide a glossy coated cement substrate.

The aqueous polymer blend composition contains first polymer and second polymer in the dry weight ratio of 1:3 to 3:1, preferably in the ratio of 7:13 to 13:7, and most preferably in ratio of 2:3 to 3:2. The average glass transition temperature of the polymer blend of the first polymer and the second polymer is in the range of 15° C. to 50° C.

In one embodiment, the aqueous polymer blend composition contains first polymer and second polymer in the dry weight ratio of 1:1.

The aqueous polymer blend composition of this invention may be prepared by admixing the first polymer dispersion, the second polymer dispersion, and any optional components of the aqueous polymer blend composition. The components of the aqueous polymer blend composition may be added in any addition order provided that there is no destabilization of the aqueous polymer blend composition or any component.

The aqueous polymer blend composition may contain more than one type of first polymer particles or alternatively, may contain more than one type of second polymer particles. For example, the aqueous polymer blend composition may contain a polymer mixture of first polymer particles with a weight average molecular weight of 500,000, first polymer particles with a weight average molecular weight of 1,000,000, and second polymer particles with a molecular weight less than 150,000. The molecular weights, the particle diameters, the $T_g$'s, and the polymer compositions of the first polymer particles or the second polymer particles may be varied to provide an aqueous polymer blend composition with the desired application properties. Preferably, the total polymer weight of the aqueous polymer blend composition preferably contains at least 80% by weight, preferably at least 90% by weight, more preferably at least 95% by weight, first polymer and second polymer.

The aqueous polymer blend composition contains an aqueous medium which may also contain low levels of solvents including coalescents and water miscible solvents such as ethanol, propanol, and acetone. Coalescents may be added to lower the minimum film formation temperature of the polymer mixture. Suitable coalescents include, for example, diethylene glycol monoethyl ether acetate and ethylene glycol monobutyl ether. The aqueous polymer blend composition may contain less than 10 weight % solvent, preferably less than 5 weight % solvent, and more preferably less than 3 weight % solvent, based on the total weight of the aqueous polymer blend composition. Preferably, the aqueous polymer blend composition is a solvent-free aqueous composition which does not contain solvent.

The pH of the aqueous polymer blend composition is typically in the range of 7 to 10. Various bases may be added to adjust the pH including ammonium hydroxide, sodium hydroxide, potassium hydroxide, and amines such as triethanol amine, 2-amino-2-methyl-1-propanol, dimethylaminoethanol, and triethylamine. The aqueous polymer blend formulation may also contain preservatives such as biocides and mildewcides, anti-forming agents, plasticizers, surfactants, dispersants, waxes such as polyethylene wax emulsions, photoinitiators, wetting agents, rheology modifiers, colorants, and low molecular weight anionic polymers. The solids level of the nonvolatile components of the aqueous polymer blend composition may range from 10 to 70 weight % based on the weight of the aqueous polymer blend composition. In one embodiment, the aqueous polymer blend composition has a solids level in the range of 10 to 60 weight % based on the weight of the aqueous polymer blend composition, and is suitable for application by spraying.

In one embodiment, the aqueous polymer blend composition contains wax. The wax increases water beading on the surface of a coating formed from the aqueous polymer blend composition of this invention. Water beading is believed to indicate reduced wetting of the coating surface and reduction in the penetration of water into the coating and the underlying substrate. The aqueous polymer blend composition may contain from 0.1 to 10 weight % wax, preferably from 0.3 to 5 weight % wax, and more preferably from 0.5 to 4 weight % wax, based on the weight of the aqueous polymer blend composition. Wax levels above 10 weight % may adversely affect the preparation of a coated cementitious substrate from a green cementitious substrate and the aqueous polymer blend composition as the higher wax levels may inhibit the release of water during the curing step. Suitable waxes include polyethylene waxes, polypropylene waxes, paraffin waxes, polytetrafluoroethylene waxes, and mixtures thereof. In one embodiment, the aqueous composition contains an oxidized polyolefin wax, such as prepared by the process disclosed in U.S. Pat. No. 6,169,148 B1. The waxes may be provided as emulsions such as anionic wax emulsions, nonionic polyethylene emulsions, nonionic paraffin emulsions, and anionic paraffin/polyethylene emulsions or as powders such as polyethylene powder and modified synthetic wax powder. A preferred wax is anionic paraffin/polyethylene emulsion.

The aqueous polymer blend composition may contain pigments, such as titanium dioxide, red iron oxide, black iron oxide, yellow iron oxide, and opacifying polymer as disclosed in U.S. Pat. No. 6,045,871. These pigments may be present in the aqueous polymer blend composition at a level in the range of 0 to 25 weight %, based on the total weight of the solids in the aqueous polymer blend composition.

A clear coating is a dried coating, which is transparent and allows the color of the underlying substrate to be observed without a significant decrease in the intensity of the color. In one embodiment, the aqueous polymer blend composition provides a clear coating on a substrate. In this embodiment, the glass transition temperature of the first polymer and the glass transition of the second polymer have a difference of less than 10° C., preferably a difference equal to or less than 7° C., and more preferably, a difference equal to or less than 5° C. Further, to provide a clear coating, the aqueous polymer blend composition preferably contains no ingredients, which cause substantial opacity in the dried coating at the applied dry film thickness.

Examples of cementitious substrates include roof tiles, wall tiles, roof shingles, roof slates, concrete slabs such as patio floors, cement rendered walls, lap siding used on the exterior of building walls, and concrete pipes. The cementitious substrates may be coated with pigment slurry, often referred to as a color coat, which includes pigment, cement, and sand to provide a colored surface.

The aqueous polymer blend composition may be applied onto the cementitious substrate by conventional methods such as spraying, with a trowel or knife, pouring, brushing, and curtain coating. The spraying method may be, for examples, air-assisted spray, airless spray, bell or disc spraying, high volume low pressure spray, and air-assisted electrostatic spray. The aqueous polymer blend composition may be applied as one coat or as multiple coats, with or without drying between coats to provide a dry film thickness in the range of 2.5 µm to 250 µm. The aqueous polymer blend composition may dry or be allowed to dry at ambient conditions, such as temperatures in the range of 10° C. to 30° C. Alternatively, heat may be applied to dry the aqueous polymer blend composition, for example, heating in the temperature range of 25° C. to 100° C. In the method of this invention, the aqueous polymer blend composition is applied onto a green cementitious substrate and the green cementitious substrate is cured to provide a coated cementitious substrate. Alternatively, a color coat may be first applied onto the green cementitious substrate followed by the application of the aqueous polymer blend composition onto the color coat. The aqueous polymer blend composition may be dried prior to the cure step or dried during the cure step of the green cementitious substrate. In one embodiment, the coated green cementitious substrate is allowed to cure at ambient conditions. In an alternate embodiment, cure is effected by introducing the coated green cementitious substrate into a chamber with controlled temperature and humidity conditions. Suitable temperature and humidity conditions are temperatures in the range of 35° C. to 100° C. and relative humidity as high as 95%. The time required to obtain cure may be in the range of 4 to 12 hours and will be dependent on the temperature and relative humidity.

Test Methods

Weight Average Molecular Weight Measurement: The weight average molecular weights of the first polymer and second polymer were determined by gel permeation chromatography using tetrahydrofuran solvent. The measurements were based on a polymethylmethacrylate equivalent. The first polymer particle dispersion and the second polymer particle dispersion were deionized with Amberlite™ IRN-77 ion exchange resin (Amberlite is a trademark of Rohm and Haas Co.) prior to molecular weight measurements.

Average Particle Diameter Determination: The average diameter of the polymer particles was determined using a Brookhaven BI-90 Particle Sizer which employs a light scattering technique. To measure the particle diameter, a sample of 0.1 to 0.2 grams of an aqueous polymer blend dispersion was diluted to a total of 40 ml with distilled water. A 2 ml portion was delivered into an acrylic cell. The particle diameter was measured for 1000 cycles. The measurement was repeated three times and the average of three values was reported.

Primary Efflorescence Test Procedure: Primary efflorescence was characterized by the presence of white deposits on the coated cementitious substrate immediately after curing. The samples were visually observed for signs of efflorescence. Samples with no white deposits were considered to have acceptable primary efflorescence resistance and received a "no" rating.

Degree of Secondary Efflorescence Resistance Test Procedure: The degree of secondary efflorescence resistance was evaluated in an accelerated laboratory test in which the coated cementitious substrate was exposed to the condensation of moisture from a 60° C. water bath (Precision Water Bath Model 270 circulating water bath) for one day, as disclosed in U.S. Pat. No. 4,999,218. The test was conducted by placing the coated cementitious substrate above the water bath on a metal grate which held the coated side 4 cm above and facing the 60° C. water.

The degree of secondary efflorescence resistance was determined by colorimetric measurements using the L* scale which measure black to white according to a scale of 0 (black) to 100 (white). As the coated cementitious substrate had a black slurry coat, the L* value increased as the degree of efflorescence increased since efflorescence led to the formation of white deposits on the substrate surface. The initial L* value was measured before the coated cementitious substrate was placed in the water bath. The final L* value was measured after the cementitious substrate was removed from the water bath and allowed to dry for 18 hours. The secondary efflorescence was determined by the difference in the L* values, ΔL*=the final L* value minus the initial L* value. An acceptable value of ΔL* was less than or equal to zero, which indicated acceptable secondary efflorescence resistance.

Degree of Water Whitening Resistance Test: The degree of water whitening resistance was evaluated in an accelerated laboratory test. The coated cementitious substrate was exposed to condensation of moisture from a 60° C. water bath (Precision Water Bath Model 270 circulating water bath) for 24 hours. The coated cementitious substrate was placed above the water bath on a metal grate which held the coated side 4 cm above and facing the 60° C. water. The coated cementitious substrate was evaluated immediately after removal from the water bath.

The degree of water whitening resistance was characterized visually on a scale of 1 to 10, in which a rating of 10 represents a coated cementitious substrate surface without whitening, a rating of 5 represents moderate whitening of the substrate surface, and a rating of 1 represents a coated cementitious substrate with a severely whitened surface. Values of 6 and above were acceptable.

EXAMPLE 1

Preparation of Aqueous Polymer Blend Compositions and Comparative Aqueous Polymer Blend Compositions Comparative A—Preparation of Comparative Aqueous Polymer Composition Containing Second Polymer with $T_g$=26° C.

A monomer emulsion was prepared by mixing 600 g deionized water (DI water), 60.9 g sodium dodecylbenzensulfonate (23% active), 910 g butyl acrylate (BA), 1064 g methyl methacrylate (MMA), 26.0 g methacrylic acid (MAA), and 20.0 g n-dodecyl mercaptan (nDDM). A 1 gallon stirred reactor was charged with 1070 g DI water and 26 g sodium dodecylbenzenesulfonate (23% active). After the reactor content was heated to 85° C., a solution of 2 g sodium carbonate in 20 g DI water was added to the reactor. Next, 90.0 g of the monomer emulsion was added, followed by a rinse of 40 g of DI water. Immediately thereafter, a solution of 6 g of ammonium persulfate in 30 g of DI water was added. The remaining monomer emulsion was added to the reactor while maintaining a temperature of 82° C. In a separate feed, a solution of 2 g ammonium persulfate in 120 g DI water was added to the reactor. The final reaction mixture was neutralized to pH 9.0 with 28% aqueous ammonia to provide an aqueous dispersion containing particles of the second polymer. The second polymer had a composition of 45.5BA/53.2MMA/1.3MAA, a Tg of 26° C., and a weight average molecular weight of 53,000.

A comparative aqueous polymer composition was prepared by adding sequentially 292 g of water, 118.8 g of Texanol™ coalescent (Texanol is a trademark of Eastman Chemical Co.), 47.1 g of Tamol™ 165 dispersant (Tamol is a trademark of Rohm and Haas Company), 61.9 g of Michemlube™ 743 wax (Michemlube is a trademark of Michaelman Chemical Inc.), 1.0 g of Drewplus™ L-108 defoamer (Drewplus is a trademark of Drew Industrial Division of Ashland Chemical Co.), and 11.9 g of Surfynol™ 104E surfactant (Surfynol is a trademark of Air Products and Chemical, Inc.) to the aqueous dispersion containing the particles of the second polymer. The comparative aqueous polymer composition, referred to as Comparative A, had an average particle diameter of 104 nm, a solids level of 44.5%, and a Brookfield viscosity of $5.9 \times 10^{-2}$ Pa-s.

Comparative B—Preparation of Comparative Aqueous Polymer Composition Containing First Polymer with $T_g=26°$ C.

An aqueous dispersion containing the first polymer was prepared according to the process of Comparative A, except n-DDM was not added. The aqueous dispersion containing the first polymer had an average particle diameter of 104 nm, a pH of 8.1, and a solids level of 42.5 weight %. The first polymer had a composition of 45.5BA/53.2MMA/1.3MAA on a weight basis, a $T_g$ of 26° C., and a weight average molecular weight of $9.92 \times 10^5$.

A comparative aqueous polymer composition was prepared containing the aqueous dispersion of the first polymer as in Comparative A. The comparative aqueous polymer composition, referred to as Comparative B, had a solids level of 44.5%, and a Brookfield viscosity of $4.8 \times 10^{-2}$ Pa-s.

EXAMPLE 1.1

Preparation of Aqueous Polymer Blend Composition with $\Delta T_g=0°$ C.

An aqueous polymer blend composition containing particles of the second polymer, a low molecular weight polymer, and particles of the first polymer, high molecular weight polymer, was prepared by mixing equal quantities of Comparative A and Comparative B. This composition, Example 1.1, had a solids level of 43.5 weight % and a Brookfield viscosity of $5.6 \times 10^{-2}$ Pa-s. The first polymer and the second polymer had glass transition temperatures of 26° C. and the difference in the glass transition temperatures of the first polymer and the second polymer, $\Delta T_g$, was 0° C.

Comparative C—Preparation of Dispersion Containing First Polymer with $T_g=30°$ C.

An aqueous dispersion containing first polymer with a Tg=30° C., was prepared according to the process of Comparative A, except that the monomer emulsion was prepared by mixing 600 g DI water, 60.9 g sodium dodecylbenzenesulfonate (23% active), 842 g butyl acrylate, 1132 g methyl methacrylate, and 26.0 g methacrylic acid. Further n-DDM was not added. The first polymer had a weight average molecular weight of 932,000 and an average particle diameter of 118 nm.

As described in Comparative A, water, coalescent, dispersant, wax, defoamer, and surfactant were added to the aqueous dispersion to provide Comparative C. Comparative C had a solids level of 44.5% and a Brookfield viscosity of $6.5 \times 10^{-2}$ Pa-s.

Comparative D—Preparation of Dispersion Containing Second Polymer with $T_g=30°$ C.

An aqueous dispersion containing second polymer with a Tg=30° C., was prepared according to the process of Comparative A, except that the monomer emulsion was prepared by mixing 600 g DI water, 60.9 g sodium dodecylbenzenesulfonate (23% active), 842 g butyl acrylate, 1132 g methyl methacrylate, 26.0 g methacrylic acid, and 20.0 g n-dodecyl mercaptan. The second polymer had a weight average molecular weight of 54,000 and an average particle diameter of 113 nm.

As described in Comparative A, water, coalescent, dispersant, wax, defoamer, and surfactant were added to the aqueous dispersion to provide Comparative D. Comparative D had a solids level of 44.5 weight % and a Brookfield viscosity of $5.8 \times 10^{-2}$ Pa-s.

Comparative E—Preparation of Dispersion Containing Second Polymer with $T_g=40°$ C.

An aqueous dispersion containing second polymer with a Tg=40° C., was prepared according to the process of Comparative A, except that the monomer emulsion was prepared by mixing 600 g DI water, 60.9 g sodium dodecylbenzenesulfonate (23% active), 686 g butyl acrylate, 1288 g methyl methacrylate, 26.0 g methacrylic acid, and 20.0 g n-dodecyl mercaptan. The second polymer had a weight average molecular weight of 55,500 and an average particle diameter of 114 nm.

As described in Comparative A, water, coalescent, dispersant, wax, defoamer, and surfactant were added to the aqueous dispersion to provide Comparative E. Comparative E had a solids level of 44.5 weight % and a Brookfield viscosity of $6.7 \times 10^{-2}$ Pascal-second (Pa-s).

EXAMPLE 1.2

Preparation of Aqueous Polymer Blend Composition with $\Delta T_g=0°$ C.

An aqueous polymer blend composition was prepared by mixing equal quantities of Comparative C and Comparative D.

EXAMPLE 1.3

Preparation of Aqueous Polymer Blend Composition with $\Delta T_g = 4°$ C.

An aqueous polymer blend composition was prepared by mixing equal quantities of Comparative C and Comparative A.

Comparative F—Preparation of Comparative Aqueous Polymer Blend Composition with $\Delta T_g = 10°$ C.

A comparative aqueous polymer blend composition was prepared by mixing equal quantities of Comparative C and Comparative E.

TABLE 1.1

Aqueous Polymer Blend Composition and Comparative Aqueous Polymer Blend Compositions

| Composition | First Polymer $T_g$ (° C.) | Second Polymer $T_g$ (° C.) | $\Delta T_g$ (° C.) |
|---|---|---|---|
| Example 1.1 | 26 | 26 | 0 |
| Example 1.2 | 30 | 30 | 0 |
| Example 1.3 | 30 | 26 | 4 |
| Comparative A | — | 26 | — |
| Comparative B | 26 | — | — |
| Comparative F | 30 | 40 | 10 |

EXAMPLE 2

Preparation of Coated Cementitious Substrates

Preparation of Green Cementitious Substrate: A sand/cement mixture was prepared by adding 850 g Type I Portland cement and 2550 g 45 mesh sand and mixing on a Hobart Mixer, Model N-50 (Hobart Canada, Ontario, Canada). Next, 408 g DI water was slowly added and mixed into the sand/cement mixture to prepare a concrete mix. A sample patty, Patty-A, was prepared by pouring the concrete mix into a 8.5 cm diameter Petri dish and flattening the surface with a spatula to provide a smooth surface.

A black slurry was prepared by adding 100 g Bayferrox 318M black iron oxide (Mobay Corporation) to 931 g DI water with stirring to completely wet the black iron oxide. Next, 2000 g Type I Portland cement was slowly added with continuous stirring to obtain an uniform mixture. Then, 1000 g 100 mesh sand was added until the sand was thoroughly mixed into the mixture to provide the black slurry. A layer of black slurry, approximately 0.4 mm thick, was applied onto the smoothed surface of the concrete tile to form a green cementitious substrate sample.

A layer of the aqueous polymer blend composition or a comparative aqueous polymer blend composition, approximately 0.025 mm thick, was applied by spray onto the black surface of the green cementitious substrate sample. Cure of the coated green cementitious substrate sample was achieved in a humidity/oven chamber at 75% relative humidity with exposure to the following cure conditions: 5 hours at 50° C. to provide the coated cementitious substrate.

EXAMPLE 3

Evaluation of Coated Cementitious Substrates

After cure, the initial degree of primary efflorescence and the initial L* value were determined for the coated cementitious substrate samples. Subsequently, the degree of water whitening resistance and secondary efflorescence were determined. The results for the aqueous polymer blend composition and the comparative compositions are listed in Table 3.1.

TABLE 3.1

Properties of Coated Cementitious Substrates

| Composition | Primary Efflorescence | Water Whitening Resistance | Initial L* | Final L* | Secondary Efflorescence $\Delta L*$ |
|---|---|---|---|---|---|
| Example 1.1 | no | 10 | 34 | 32 | −2 |
| Example 1.2 | no | 7 | 33 | 32 | −1 |
| Example 1.3 | no | 6 | 34 | 32 | −2 |
| Comparative A | yes | 5 | 32 | 36 | +4 |
| Comparative B | no | 8 | 36 | 37 | +1 |
| Comparative F | no | 7 | 35 | 37 | +2 |

The results in Table 3.1 show that the aqueous polymer blend composition, as exemplified by Examples 1.1–1.3, provided a coated cementitious substrate with a combination of acceptable water whitening resistance, primary efflorescence resistance, and secondary efflorescence resistance. In contrast, a coating prepared from Comparative F, the comparative aqueous polymer blend composition with a 10° C. difference in the glass transition temperatures of the first polymer and the second polymer, did not have acceptable water whitening resistance and secondary efflorescence resistance. Comparative A provided a coating with unacceptable water whitening resistance, and unacceptable secondary efflorescence resistance. Comparative B provided a coating with unacceptable secondary efflorescence.

We claim:

1. An aqueous polymer blend composition comprising:
   a) particles of a first polymer; and
   b) particles of a second polymer;
wherein said first polymer has a weight average molecular weight of 250,000 or greater; wherein said second polymer has a weight average molecular weight of 150,000 or less; wherein said particles of said second polymer have an average diameter in the range of 20 nm to 350 nm; wherein the glass transition temperature of said first polymer and the glass transition temperature of said second polymer have substantially the same value;
wherein the weight ratio of said first polymer to said second polymer is in the range of 1:3 to 3:1; and wherein the average glass transition temperature of said first polymer and said second polymer is in the range of 15° C. to 50° C. and
wherein said composition contains less than 2 weight percent surfactant.

2. The aqueous polymer blend composition according to claim 1 wherein the difference in said glass transition temperature of said first polymer and said glass transition temperature of said second polymer is 5° C. or less.

3. The aqueous polymer blend composition according to claim 1 wherein said particles of said first polymer have an average diameter in the range of 60 nm to 170 nm.

4. The aqueous polymer blend composition according to claim 3 wherein said particles of said second polymer have an average diameter in the range of 60 nm to 170 nm.

* * * * *